US 6,742,319 B2

(12) United States Patent
Lauder

(10) Patent No.: US 6,742,319 B2
(45) Date of Patent: Jun. 1, 2004

(54) METHOD OF SUPPLYING A NET MOULDED SYNTACTIC ARTICLE AND RELATED SHIPPING PACKAGES

(75) Inventor: Arnold J. Lauder, Winnipeg (CA)

(73) Assignee: The Boeing Company, Seattle, WA (US)

( * ) Notice: Subject to any disclaimer, the term of this patent is extended or adjusted under 35 U.S.C. 154(b) by 0 days.

(21) Appl. No.: 10/234,557

(22) Filed: Sep. 4, 2002

(65) Prior Publication Data

US 2004/0040263 A1 Mar. 4, 2004

(51) Int. Cl.[7] ............................. B65B 7/00; B65B 63/08
(52) U.S. Cl. ........................................... 53/467; 53/440
(58) Field of Search ........................... 53/440, 467, 122

(56) References Cited

U.S. PATENT DOCUMENTS

| | | | | |
|---|---|---|---|---|
| 2,893,168 A | * | 7/1959 | Kobs | 47/73 |
| 2,958,905 A | | 11/1960 | Newberg et al. | |
| 2,959,508 A | | 11/1960 | Graham et al. | |
| 3,014,614 A | * | 12/1961 | Carroll | 220/660 |
| 3,322,700 A | | 5/1967 | Dowd | |
| 3,961,444 A | * | 6/1976 | Skaife | 47/79 |
| 4,411,122 A | * | 10/1983 | Cornish et al. | 53/436 |
| 4,748,796 A | * | 6/1988 | Viel | 53/411 |
| 4,788,230 A | * | 11/1988 | Mudge | 523/219 |
| 4,915,528 A | * | 4/1990 | Seager | 401/68 |
| 5,307,608 A | * | 5/1994 | Muir et al. | 53/440 |
| 5,312,240 A | * | 5/1994 | Divone, et al. | 425/385 |
| 5,440,860 A | * | 8/1995 | Meli et al. | 53/451 |
| 5,783,272 A | | 7/1998 | Wong | |
| 6,361,731 B1 | * | 3/2002 | Smith et al. | 264/271.1 |

OTHER PUBLICATIONS

Loctite Aerospace, Description of "SynSpand® 9899.1CF, Expanding Syntactic Film"; Rev. 1/01.
Dexter Specialty Products Selector Guide. Downloaded Apr. 11, 2001 from http://www.dexteraero.com/adhesive/selectorguidedisplay.cfm?ID=5.
Flotation Technologies, "Custom Fabricated Syntactic Foams". Downloaded Apr. 11, 2001 from wysiwyg://52/http://www.flotec.com/flo11.html.

* cited by examiner

Primary Examiner—John Sipos
Assistant Examiner—Paul Durand
(74) Attorney, Agent, or Firm—Alston & Bird LLP

(57) ABSTRACT

A method of manufacturing and supplying a net-moulded article of expandable syntactic material and a related shipping package are provided. The moulded article is formed at a manufacturing facility where the forming process can be controlled to ensure production of quality syntactic material articles. The moulded article is formed by dispensing the material into a mould having a cavity with a shape matching that of a desired syntactic article to be used in an assembly at a point of use. The mould and moulded article are covered with a protective film to form a mould kit which is shipped to the point of use location. At the point of use location the moulded article is removed from the mould and preferably immediately positioned in the assembly without significant cutting, trimming, forming or other labor intensive actions. Once positioned, the net-moulded article and the assembly are cured to integrate the moulded article with the assembly.

8 Claims, 7 Drawing Sheets

METHOD OF SUPPLYING A NET MOULDED SYNTACTIC ARTICLE AND RELATED SHIPPING PACKAGES

FIELD OF THE INVENTION

The present invention is related to the field of syntactic materials, more particularly to methods of manufacturing and supplying syntactic materials and related shipping packages.

BACKGROUND OF THE INVENTION

Expandable thermoplastic resinous or syntactic materials are typically comprised of combinations of expandable thermoplastics and thermosettable matrix resins. Expandable syntactic materials have properties such as application tailored density and a high compression strength that make them ideal for reinforcing composite and honeycomb structures in aerospace craft. U.S. Pat. No. 2,958,905 to Newberg et al. and U.S. Pat. No. 2,959,508 to Graham et al. describe the use of expandable syntactic materials to form moulded syntactic articles. Generally, a mass of expandable thermoplastic resinous material is placed in a confining mould form or cavity. An exothermically self-reacting agent is added to the thermoplastic resinous material and an external heat source, such as an autoclave or an oven, is used to initiate a reaction involving the agent. The agent's reaction generates heat and causes expansion of the thermoplastic resinous material to fill the mould form. Despite the weight and strength advantages of the expandable syntactic materials, the formation processes described above are difficult to control so as to achieve a homogenous distribution of the expandable syntactic material.

U.S. Pat. No. 5,783,272 to Wong describes the production of an expandable film that has a relatively uniform density and thickness across its breadth. After manufacture, the film is shipped to a work site and is manipulated into a shape to meet the user's requirements. The film is then cured so that it expands and fills the mould or cavity.

In one example of the use of such films, the syntactic film (SynSpand® 9899CF or 9899.1CF from Loctite Corporation of Bay Point, Calif.) is supplied in 1 ft by 2 ft sheets having a thickness of approximately 100 mils. The sheets are cut into a desired shape and used to form a syntactic article, such as a drag link area reinforcement for an aircraft component. The drag link area reinforcement has a three-dimensional shaped body 210 that includes four local reinforcement pads 211 and two tooling-pin locating pads 212, as shown in FIG. 1. As the syntactic film sheets do not match the thickness of the body of the drag link reinforcement, two sheets must be stacked to form the body and additional multiple sheets must stacked to form the pads. Once the basic drag link shape has been formed by cutting and stacking the sheets, the sheets are laid-up onto honeycomb core and/or layered carbon fiber sheets to form an assembly which is then cured to embed the syntactic material. In another example, a hinge pad reinforcement 213 requires three trimmed and stacked sheets of syntactic film, as shown in FIG. 2. Despite the advantage of producing a more homogenous distribution of the syntactic material, on-site construction of the ply kits results in significant waste of the syntactic material and requires a large amount of manual labor and machine kitting resources.

Therefore, it would be advantageous to have a method of deploying expandable syntactic materials on-site without encountering difficult process requirements that lower the quality of the resulting article. It would be further advantageous if the article could be manufactured on-site without a large amount of manual labor or waste of the syntactic materials.

SUMMARY OF THE INVENTION

The present invention addresses the above needs and achieves other advantages by providing a method of manufacturing and supplying a net-moulded article of expandable syntactic material and related shipping package. The moulded article is formed at a manufacturing facility where the forming process can be controlled to ensure production of quality syntactic material articles. The moulded article is formed by dispensing the material into a mould having a cavity with a shape matching that of a desired syntactic article to be used in an assembly at a point of use. The mould and moulded article are covered with a protective film to form a mould kit and the mould kit is shipped to the point of use location. At the point of use location, the moulded article is removed from the mould and preferably immediately deployed in the assembly without significant cutting, trimming, forming or other labor intensive actions. Once positioned, the net-moulded article and the assembly are cured to integrate the moulded article with the assembly.

In one embodiment, the present invention includes a method of manufacturing a net-moulded syntactic article at a manufacturing facility and supplying the article to a point of use. The manufacturing and supply method includes supporting an empty mould defining a cavity that has a geometry congruent to a desired or predefined geometry of the net-moulded syntactic article. A syntactic material is placed into the mould until the cavity is filled with the material. As the material fills the cavity, it conforms to the geometry of the cavity. The mould is removed from its support, and the mould with the net-moulded syntactic article therein are packaged for safe transport such that the mould serves as a shipping package. The mould and net-moulded syntactic article are then transported from the manufacturing facility to the point of use. Once at the point of use, the net-moulded syntactic article is removed from the mould and is positioned in an assembly configured to accept the net-moulded syntactic article.

In one aspect, the mould is durable enough to be reusable and can be returned to the manufacturing facility after the net-moulded syntactic article is removed. The returned mould can then be filled again with amorphous syntactic material and transported back to the point of use. Such reusability provides a supply chain management option to the parties wherein the return of the mould, or a quantity of moulds, is a signal that additional net-moulded articles are required at the point of use. Also, the relatively quick "just-in-time" manufacture and deployment of the net-moulded article provide the option of transporting the article and mould at ambient temperature instead of at the freezing temperatures necessary to extend the life of the syntactic material.

In yet another aspect, a film or other cover may be placed over the mould and sealed to the mould so as to protect the net-moulded syntactic article therein during shipping. The film may be at least partially transparent to facilitate viewing of the net moulded syntactic article during shipment. Once at the point of use, the film is removed from the mould and the net-moulded article is removed from the mould cavity and deployed in the assembly.

In another aspect, the mould may be formed on a die which is also used to support the mould while it is being filled with amorphous syntactic material. For instance, the mould may be constructed of a thin sheet material vacuum drawn into a cavity of the die. Once the mould is formed on the die, the amorphous syntactic material can be injected into the cavity of the mould.

The present invention has several advantages. The net-moulded syntactic article is configured at the manufacturing site for immediate deployment into the assembly at the on site location without trimming, stacking or other additional steps. Such trimming and stacking is labor-intensive and typically results in wasted syntactic material. In addition, the material consistency of the syntactic article is improved because process controls are more easily exercised at the manufacturing site than at the point of use. The mould itself serves as a shipping container, cutting down on the number of steps required for packaging and shipping the syntactic article. In addition, return of the mould reduces materials costs and serves to notify the manufacturing location of the need for another net-moulded syntactic article at the point of use. The combination of quick installation of the net-moulded article and the use of a returned mould as a demand signal supports a "just-in-time" manufacturing process. Such short-term manufacturing also allows the syntactic article to be shipped at ambient temperature, obviating the need for frozen storage during shipping and before installation.

BRIEF DESCRIPTION OF THE DRAWINGS

Figure 1:
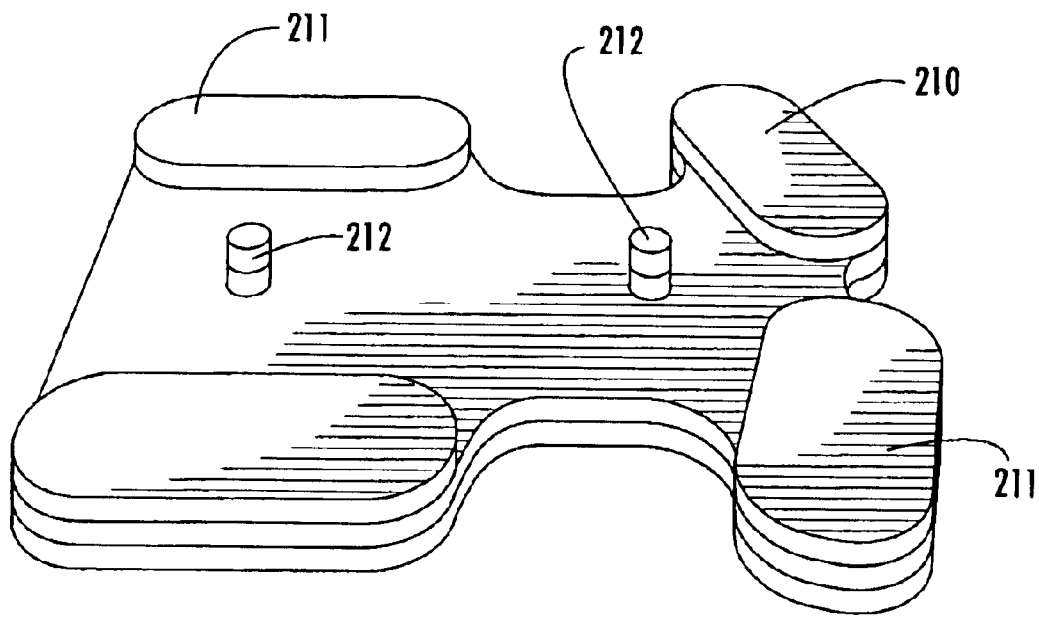
Figure 2:
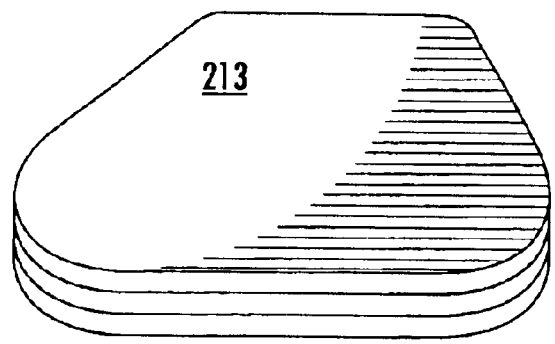
Figure 3:
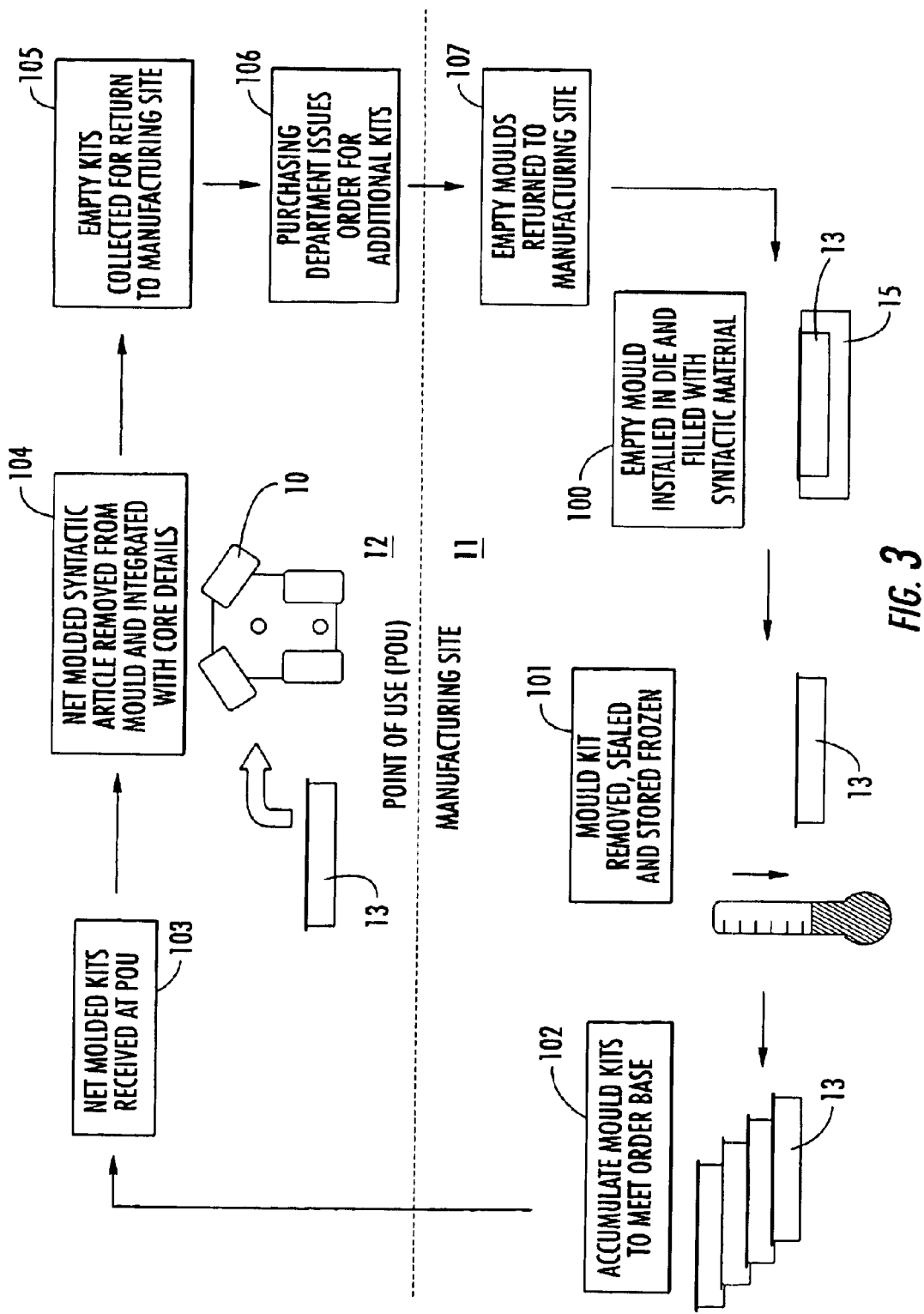
Figure 4:
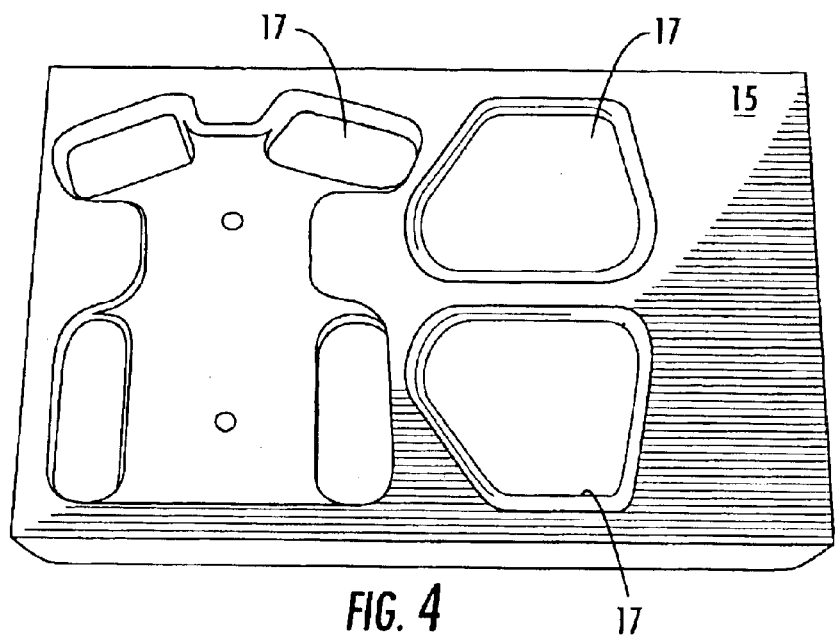
Figure 5:
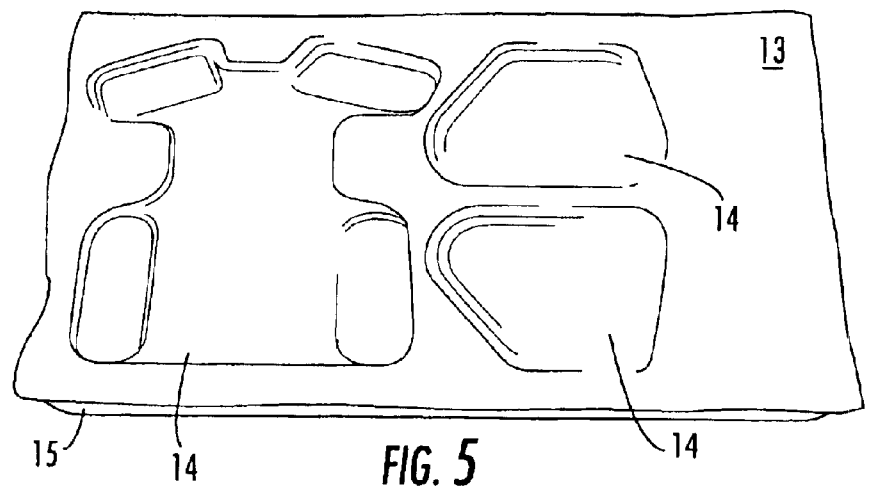
Figure 6:
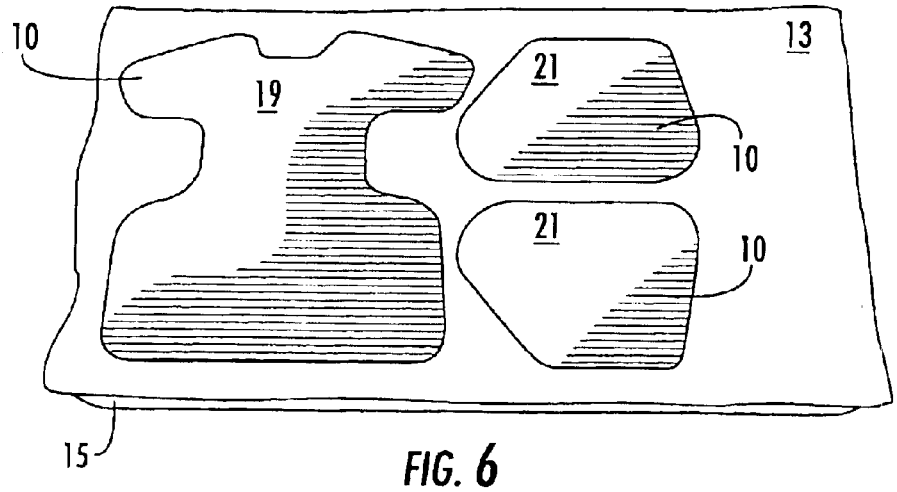
Figure 12:
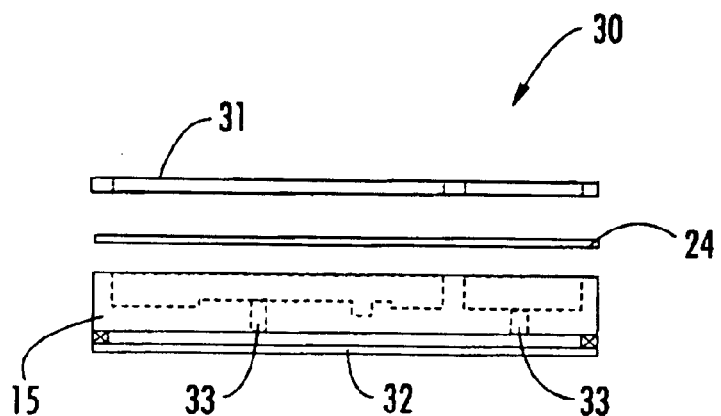
Figure 7:
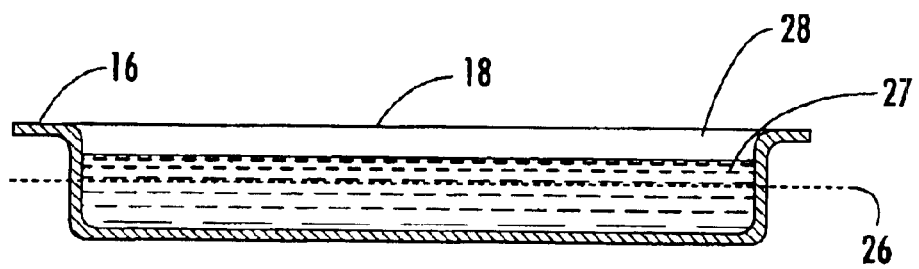
Figure 13:
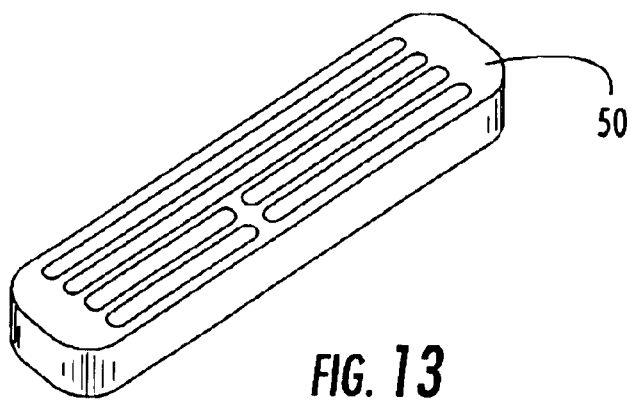
Figure 8:
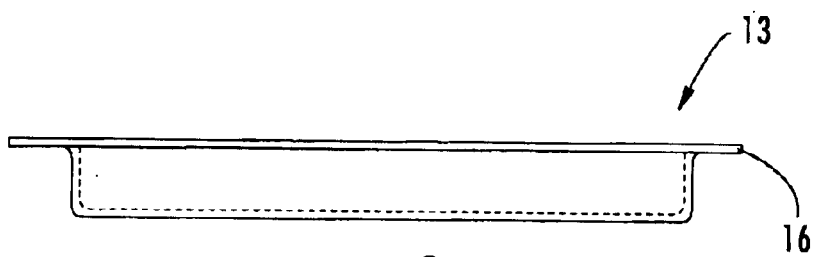
Figure 9:
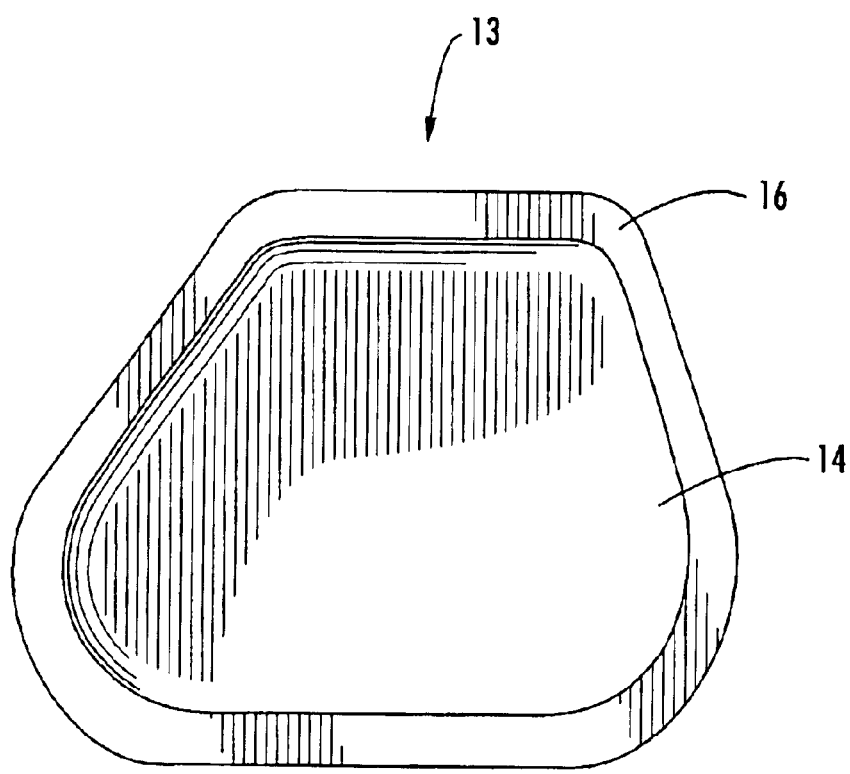
Figure 10:
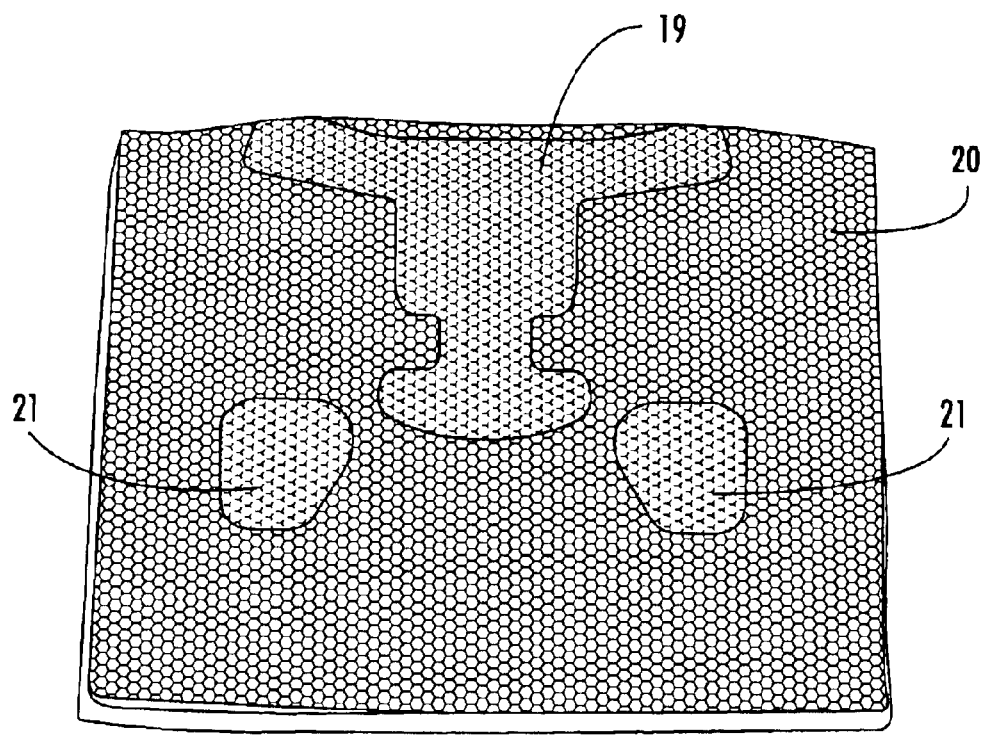
Figure 11:
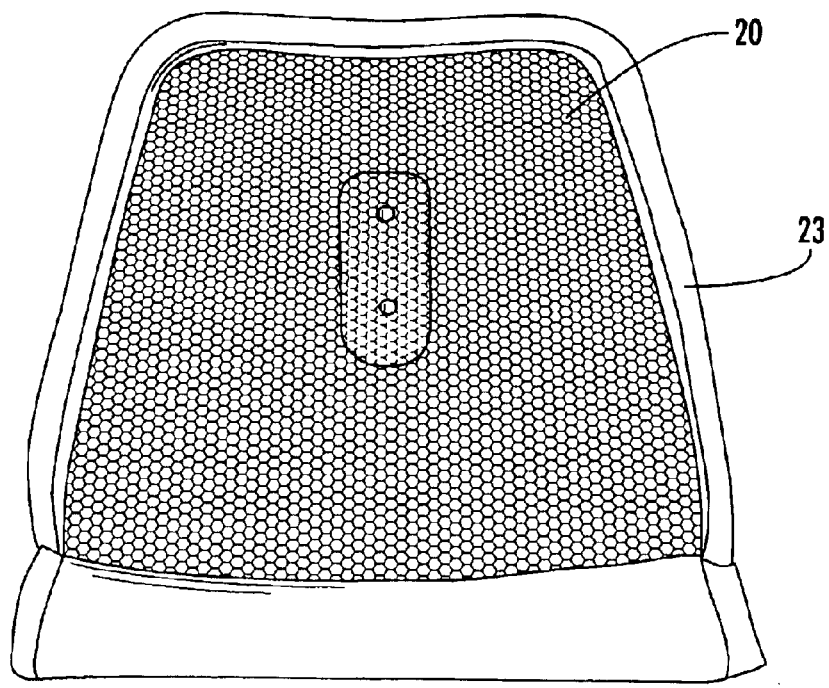

Having thus described the invention in general terms, reference will now be made to the accompanying drawings, which are not necessarily drawn to scale, and wherein:

FIG. 1 is a perspective view of a syntactic article of the prior art employing layers of syntactic film trimmed and manually stacked to produce a reinforcement for a drag link of an aircraft;

FIG. 2 is a perspective view of another syntactic article of the prior art employing layers of syntactic film trimmed and manually stacked to produce a reinforcement for a hinge pad of an aircraft;

FIG. 3 is a flowchart of a manufacturing and supply method of one embodiment of the present invention;

FIG. 4 is a perspective view of a die tool used in the method shown in FIG. 3;

FIG. 5 is a perspective view of a mould for forming net-moulded syntactic articles used in the method shown in FIG. 3 supported by the die tool shown in FIG. 4;

FIG. 6 is a perspective view of the mould of FIG. 5 filled with a syntactic material;

FIG. 7 is an elevated, cross-sectional view of a mould filled with a syntactic material and sealed with a film to form a mould kit for shipping of another embodiment of the present invention;

FIG. 8 is a side elevation view of a hinge pad reinforcement mould of another embodiment of the present invention;

FIG. 9 is a plan view of the hinge pad reinforcement mould of FIG. 8;

FIG. 10 is a perspective view of a bondment of composite honeycomb core panels laid up and cured with net-moulded synspand drag link and hinge pad reinforcements of another embodiment of the present invention;

FIG. 11 is a perspective view of another bondment of composite honeycomb core panels cured with an edgeband closeout of net-moulded syntactic material of yet another embodiment of the present invention;

FIG. 12 is a side elevation view of a forming assembly of one embodiment of the present invention; and FIG. 13 is a perspective view of a mould for forming net-moulded strips of syntactic material of one embodiment of the present invention.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In one embodiment, the present invention includes a method or system of manufacturing net-moulded articles 10 of expandable syntactic material at a manufacturing site 11 and supplying the moulded articles to a point of use 12 for installation, preferably immediate installation, into an assembly at the point of use, as shown in FIG. 3. The method and system described herein applies to the use of SynSpand® 9899CF or 9899.1CF type syntactic materials (Loctite Corporation of Bay Point, Calif.) but also applies to the use of other types of expandable materials and other resinous materials.

At the manufacturing site 11 an empty mould 13 is installed 100 or placed into a cavity 17 of a supporting tool or die 15, as shown in FIGS. 3, 4 and 5. The mould includes a cavity 14 which defines a desired geometry or shape of the moulded article 10. The mould cavity 14 is filled, preferably by injection, with the syntactic material in an amorphous or flowable state, as shown in FIG. 6. Such an amorphous state can be achieved in many ways known to those of skill in the art, but is typically due to the application of heat, chemical solutions, or both. In one example, injection temperatures range from 120° F. to 140° F. and injection pressures range between 50 psig and 100 psig to achieve the amorphous state. At such temperatures and pressures, the syntactic material is dispensed with a density of approximately 45 lb/ft³. During injection, the cavity 14 of the mould 13 is filled past a minimum material requirement level 26 so as to include an excess material allowance 27 above which is an empty cavity volume 28, as shown in FIG. 7. The excess material allowance 27 acts as a buffer against processing variations that might otherwise result in the moulded article 10 having an insufficient thickness. Further, the empty volume allows the filled mould 13 to be easily sealed with the plastic film 18 and stacked for efficient shipment.

In another example of a suitable dispensing method, the syntactic material is loaded into SEM kit tubes (available through SEMCO of PPG INDUSTRIES, Pittsburgh, Pa.) and heated to 130° F. The SEM kit tube is then installed into a SEM kit gun body which is also preheated to 130° F. to improve the flow of the syntactic material. After injection, the syntactic material can be consolidated, if necessary, by the application of compression to the mould, die and syntactic material. As an example of this option, compression is applied by placing the mould, die and syntactic material between the platens of a materials testing machine. Depending upon the amount of excess material supplied to the mould cavity 14, the applied pressures range from less than 2 psi up to about 18 psi. The compression process can be facilitated with the use of a male plug that is driven into the cavity 14 of the mould 13 so as to eliminate excess material above the mould cavity and level the mould material.

Other devices for dispensing the syntactic material in metered samples may also be used in the present invention, such as a screw-driven extrusion device. The present invention is also not limited to automated dispensing of the syntactic material into the mould cavity 14. For instance, heating portions of syntactic film manually cut into pieces and placed in the mould cavity to about 160° F., along with the above-described compression step, will also result in consolidation of the syntactic material into the mould cavity. Regardless of the method used to dispense the expandable syntactic material into the mould cavity, it is preferable to use methods that avoid breaking the micro-balloons of the syntactic material.

Once the mould 13 has been filled with syntactic material, the moulded article 10 and the mould are released 101 from the die, as shown in FIG. 3. Before release, the mould and article may be allowed to cool, or can be actively cooled, such as by coolant flowing through channels in the die 15 or by the use of chiller units. The mould 13 preferably includes a flange 16 around its outer periphery which facilitates release of the mould and the article 10 from the die, as shown in FIGS. 8 and 9. The mould 13 is removed by gripping the flange 16 and using the grip on the flange to pull the mould free of the die cavity 17 or with ejector pins in the die cavities.

Once free, a plastic, metal or other type of film or cover 18 is placed over the net-moulded syntactic article 10 and sealed onto the flange 16 around the periphery of the mould 13. In one instance, the film is at least partially transparent to facilitate visual inspection of the net moulded syntactic article during transport. Together, the film 18 and the mould 13 form a kit or shipping package that protects the article from damage. Optionally, the mould 13 and net-moulded syntactic article 10 may then be cooled or frozen to increase its shelf life. However, one advantage of the present invention is that net moulding of the articles 10 allows them to be shipped and installed on a "just in time" schedule without being frozen. In a just in time schedule, the articles reach and are deployed at the point of use 12 before the maximum out time of the syntactic material elapses. In the case of Synspand® 9899.1CF, the maximum out time is about 15 days at 77° F.

The mould kits, each including the moulded article 10 sealed in the mould 13 with the plastic film 18, are accumulated 102 at the manufacturing site 11 until reaching a minimum, or base order, as shown in FIG. 3. The mould kits may be frozen and held in cold-storage if a long time is expected to elapse before shipping or installation. Once the order base is reached, the accumulated mould kits are shipped using such modes of transportation as a truck, plane or train. A refrigerated truck may be used for moulded articles expected to require a long shelf-life. Preferably, the mould kits are marked before shipping for identification and tracking purposes.

After shipping, the net-moulded articles 10 in their respective moulds 13 are received 103 at the point of use 12, as shown in FIG. 3. The mould kits can then either be stored for use as needed, or the net-moulded syntactic articles 10 can be immediately employed in a just in time production process. Regardless, each article is removed 104 from its mould cavity 14 when needed and is integrated into an assembly. The net-moulded syntactic article 10 has the advantage of being immediately deployable into the assembly without additional cutting, forming or shaping.

The net-moulded synspand article 10 can be employed in any type of assembly wherein an article having a particular, known geometry is required and has been communicated to the manufacturer of the article. In one example, a drag link reinforcement 19 and a pair of hinge pads 21 to support fabrication of a sub-assembly used for an aircraft thrust reverser blocker door are removed from a single mould 13. The drag link reinforcement 19 and the hinge pads 21 are laid up on the surface of a core detail or bondment 20 comprising an assembly of fiber reinforced honeycomb core composite panels, as shown in FIG. 10. The bondment is a subassembly used in a multiple stage processing line. The moulded articles 10 are then embedded into the bondment 20 by the application of a cure cycle to the entire assembly. In another example, a moulded strip article is embedded as an edgeband 23 on another type of thrust reverser blocker door assembly, as shown in FIG. 11. A mould 50 for forming several of the moulded strip articles is shown in FIG. 13.

Once the syntactic article 10 has been removed from the mould 13, the empty moulds are collected 105 and stored until reaching a critical number, as shown in FIG. 3. A purchase order is issued 106 for refilling the existing moulds, and for any additional mould kits required. The empty moulds are returned 107 to the manufacturing site 11 where the process of installing 100 and filling the moulds with syntactic material is repeated. As an alternative to the use of purchase orders, receipt of the empty moulds may serve as an explicit or implicit request for additional net-moulded syntactic articles 10 sufficient to fill the empty moulds. In this manner, each mould 13 acts as a reusable shipping container. If the cost of the moulds are relatively low, then the moulds could also be disposed of and reordering would be performed using purchaser order or the like.

As described above, each mould 13 preferably acts as a parting film or liner after it is filled with syntactic material, is a shipping package that must maintain its shape during handling and is reusable for multiple installation and filling 100 cycles. Each mould 13 is preferably constructed of lightweight, yet strong thermoplastic sheet material 24 such as an acrylonitrile butadiene styrene (ABS) thermoplastic. The sheet material 24 is thermoplastic to allow it to be formed on the die 15 in the process described below. Other materials may also be used to construct the mould 13. Generally, the mould 13 should be constructed of a material able to withstand syntactic material shipping and production temperatures between −40° F. to 200° F. The lower temperature could be revised upwards in cases where just in time delivery and installation obviates the need for cold storage. A wall thickness of 0.03 inches to 0.08 inches for the sheet material 24 is preferred due to the need to incorporate the thickness into the die tool 15 design. In another alternative, the mould 13 could be manufactured using an injection moulding process as is known to those of skill in the art. The mould 13 also could be manufactured with sufficient stiffness so that the die 15 is not required during syntactic material injection and consolidation.

By way of example, the mould 13 in one instance is formed of a 4'×8' section of the 0.03 inch thick thermoplastic sheet material 24 on a forming assembly 30, as shown in FIG. 12. The forming assembly includes the die 15 having its die cavity 17 with a plurality of holes 33 each approximately ¼ of an inch in diameter defined therein, a frame 31 disposed over the die and a vacuum plate 32 disposed under the die. During forming, the die 15 is preheated to 180° F. The sheet material 24 is cut to match the face of the die and is placed between the frame 31 and the face of the die 15, over the die cavity 17. The frame 31 is clamped to the die 15 to sandwich the sheet material 24 therebetween. The vacuum plate 32 is sealed to the perimeter of the die 15 and vacuum is applied to the base of the vacuum plate 32 which is translated through the holes 33. The forming assembly 30 is placed in an oven (not shown) preheated to 340° F. The vacuum on the die 15 draws the sheet material 24 into the die cavity 17 as the temperature of the sheet material increases. If desired, the frame 31 may be an open frame that allows inspection of the sheet material 24 to ensure that the vacuum draw has been successful. The open frame 31 clamps only the sheet material 24 extending around the periphery of the die cavity 17. The forming assembly 30 is removed from the oven, the vacuum is released and the frame is removed to reveal the vacuum-drawn sheet material 24. The die 15 is cooled to approximately 180° F. and the finished mould 13 can be removed and stored for later use, or immediately filled with the syntactic material while supported by the die, as shown in FIG. 6. When immediately filled with syntactic material, the installation part of step 100 is advantageously avoided.

The die 15 is preferably constructed of a rigid material, such as aluminum, and its cavity 17 is machined or cast to a shape and depth required to satisfy engineering specifications, as shown in FIG. 7. Before die construction, various details on an assembly requiring syntactic material reinforcement are identified. These details are quantified using the dimensions from engineering drawings, computer modeling or other available mathematical definitions of the geometry of the article 10. A mathematical definition may also be pulled from the dimensions of a preexisting, manually stacked and moulded syntactic article or one or more article templates.

In one example, the mathematical definition of the geometry of the article 10 is used by a computer controlled milling machine to cut the die cavity 17 into a tooling board to form the die 15. The depth of the cavity is adjusted along the vertical, or Z-axis, of the milling machine to allow for the excess material allowance 27 and the empty cavity volume 28. In another example, a master model is machined out of wax by a computer controlled milling machine using the mathematical definition of the moulded article 10. The wax master model is then used to cast a silastic E room-temperature vulcanizing (RTV) die tool. Advantageously, the dies can be developed by the end-user to promote inexpensive production by the manufacturer. Die production by the end-user ensures that the die, and the syntactic articles 10 produced therewith, are manufactured to the specifications desired by the end-user. The manufacturer also benefits by inexpensively expanding its product line.

The present invention has several advantages. The net-moulded syntactic article 10 is configured at the manufacturing site 11 for immediate deployment into the assembly at the point of use location 12 without trimming, stacking or other additional steps. Such trimming and stacking is labor-intensive and typically results in wasted syntactic material. In addition, the material consistency of the syntactic article 10 is improved because process controls are more easily exercised at the manufacturing site 11 than at the point of use 12. The mould 13 itself serves as a shipping container, cutting down on the number of steps required for packaging and shipping the syntactic article. In addition, return of the mould reduces materials costs and serves to notify the manufacturing location of the need for another net-moulded syntactic article 10 at the point of use 12. The combination of quick installation of the net-moulded article and the use of a returned mould 13 as a demand signal supports "just-in-time" manufacturing processes. Such rapid manufacturing also allows the syntactic article 10 to be shipped at ambient temperature, obviating the need for frozen storage during shipping and before installation.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A method of manufacturing a net-moulded syntactic article at a manufacturing facility and supplying the net-moulded syntactic article to a point of use, the manufacturing and supply method comprising:

supporting an empty mould having defined therein a cavity, said cavity having a geometry congruent to a desired geometry of the net-moulded syntactic article;

filling the cavity with a syntactic material and conforming the material to the geometry of the cavity;

removing support from the mould and packaging the mould containing the net-moulded syntactic article for transport;

transporting the mould containing the net-moulded syntactic article from the manufacturing facility to the point of use;

removing the net-moulded syntactic article from the mould; and deploying the net-moulded syntactic article in an assembly configured to accept the net-moulded syntactic article.

2. A method of claim 1, further comprising returning the mould to the manufacturing facility after removing the net-moulded syntactic article and reusing the mould to manufacture and ship another net-moulded syntactic article.

3. A method of claim 1, wherein transporting the mould includes transporting the syntactic article at ambient temperature.

4. A method of claim 1, wherein packaging the mould includes placing a plastic film over the mould and sealing the syntactic article inside the mould.

5. A method of claim 1, wherein placing the material includes injecting the material.

6. A method of claim 1, further comprising communicating the desired geometry from the point of use to the manufacturing facility and forming the cavity in the mould to have the geometry congruent with the desired geometry before supporting the empty mould.

7. A method of claim 1, further comprising forming the mould on a die and supporting the mould in the die while placing the amorphous syntactic material into the cavity of the mould.

8. A method of claim 7, wherein forming the mould includes vacuum forming the mould on a die.

* * * * *